United States Patent [19]

Willis

[11] 4,305,023
[45] Dec. 8, 1981

[54] RASTER DISTORTION CORRECTED DEFLECTION CIRCUIT

[75] Inventor: Donald H. Willis, Indianapolis, Ind.

[73] Assignee: RCA Corporation, New York, N.Y.

[21] Appl. No.: 166,677

[22] Filed: Jul. 7, 1980

[51] Int. Cl.³ ............................................. H01J 29/56
[52] U.S. Cl. .................................................... 315/371
[58] Field of Search ................................. 315/370, 371

[56] References Cited

U.S. PATENT DOCUMENTS

| | | |
|---|---|---|
| 4,088,931 | 5/1978 | Haferl . |
| 4,118,655 | 10/1978 | Wolber . |
| 4,140,949 | 2/1979 | Terry . |
| 4,169,989 | 10/1979 | Zappala . |
| 4,182,978 | 1/1980 | Boekhorst . |

Primary Examiner—Theodore M. Blum
Attorney, Agent, or Firm—Paul J. Rasmussen; William H. Meagher; Joseph Laks

[57] ABSTRACT

An inverter applies a square-wave exciting voltage of horizontal deflection frequency to the primary winding of a ferroresonant power transformer. A square-wave alternating polarity output voltage developed across a secondary winding of the ferroresonant transformer is half-wave rectified and applied to an input choke of a horizontal deflection circuit. The input choke is coupled to the series arrangement of a horizontal deflection winding and a trace capacitor. A pincushion correction circuit switching transistor applies a DC voltage to the input choke at a controlled instant within the nonconduction interval of the half-wave rectified output voltage. The peak-to-peak horizontal scanning current is a function of the average voltage developed across the trace capacitor. This average voltage equals the average value of the voltage applied to the input choke. By varying at a vertical rate in a parabolic manner the controlled instant at which the switching transistor applies the DC voltage to the input choke, the peak-to-peak horizontal scanning current is modulated at a vertical rate in a parabolic manner to provide side pincushion correction.

25 Claims, 4 Drawing Figures

4,305,023

RASTER DISTORTION CORRECTED DEFLECTION CIRCUIT

This invention relates to raster distortion correction, such as side pincushion distortion correction, for deflection circuits.

In a television receiver, the electron beams traveling inside the television receiver picture tube are deflected by the magnetic fields generated by sawtooth deflection currents flowing in horizontal and vertical deflection windings. The deflected electron beams scan a raster pattern on the picture tube phosphor screen. The raster pattern, without correction, may display various geometric distortions, such as side or east-west pincushion distortion, and top or bottom or north-south pincushion distortion.

To correct side pincushion distortion, the peak-to-peak horizontal deflection current is modulated at a vertical rate in a parabolic manner. In some side pincushion correction circuits, a saturable reactor is placed in series with the horizontal deflection winding. The inductance of the saturable reactor is varied at a vertical rate in a parabolic manner to provide the side pincushion correction. In such circuits, the saturable reactor is a relatively expensive component and may not be suitable to provide the relatively large amounts of side pinchusion correction required for 100° or 110° deflection angle picture tubes.

Diode modulator circuits may alternatively be used to provide side pincushion correction, especially for relatively large deflection angle picture tubes. Diode modulator circuits typically operate by varying at a vertical rate in a parabolic manner the voltage developed across a modulator capacitor using a controllable shunt coupled across the modulator capacitor. The controllable shunt circuit either dissipates power across the shunting element, or if arranged in a switching shunt configuration, requires relatively complex circuitry to accomplish the switching action.

Other side pincushion correction circuits use a series-pass element between the direct current B+ supply and the horizontal deflection circuit. The impedance of the series-pass element is varied at a vertical rate in a parabolic manner to likewise vary the effective DC voltage applied to the horizontal deflection circuit. Such an arrangement undesirably dissipates power in the series-pass element and a relatively robust device is required.

A feature of the invention is to provide a correction circuit for raster distortion such as side pincushion distortion that is relatively low in dissipation and is capable of being used with large deflection angle picture tubes. As source of first voltage that includes an alternating polarity component is coupled to a horizontal deflection winding to develop a trace voltage. A deflection generator periodically applies the trace voltage to the deflection winding to generate horizontal scanning current. A source of second voltage is coupled to the horizontal deflection winding for a controlled duration within a cycle of the alternating polarity component voltage to vary the trace voltage. A control circuit, responsive to a signal representative of the raster distortion to be corrected, varies the duration that the second voltage source is coupled to the deflection winding to provide an altered horizontal scanning current. The altered scanning current results in the display of a corrected raster.

In a specific embodiment, an inverter applies a square-wave voltage to the primary winding of a power transformer. The voltage developed across a secondary winding of the power transformer is half-wave rectified to produce the first voltage at an output terminal of the half-wave rectifier. An input choke is coupled between the half-wave rectifier output terminal and the series arrangement of the horizontal deflection winding and trace capacitor. A switching element applies the second voltage to the input choke at a controlled instant within the nonconduction interval of the half-wave rectifier. The average value of the voltage applied to the input choke is controlled by controlling the turn-on instant of the switching element. This average value equals the average value of the voltage developed across the trace capacitor. By varying the turn-on instant of the switching element at a vertical rate in a parabolic manner, the average value of the trace capacitor voltage is likewise varied to modulate the peak-to-peak horizontal scanning current in a manner providing side pincushion correction.

In a further embodiment of the invention, the power transformer comprises a ferroresonant transformer having regulated voltages developed across the transformer secondary windings including the secondary winding coupled to the aforementioned half-wave rectifier. A high voltage secondary winding is coupled to a high voltage circuit to provide a regulated DC accelerating potential for the picture tube ultor.

Figure 1:
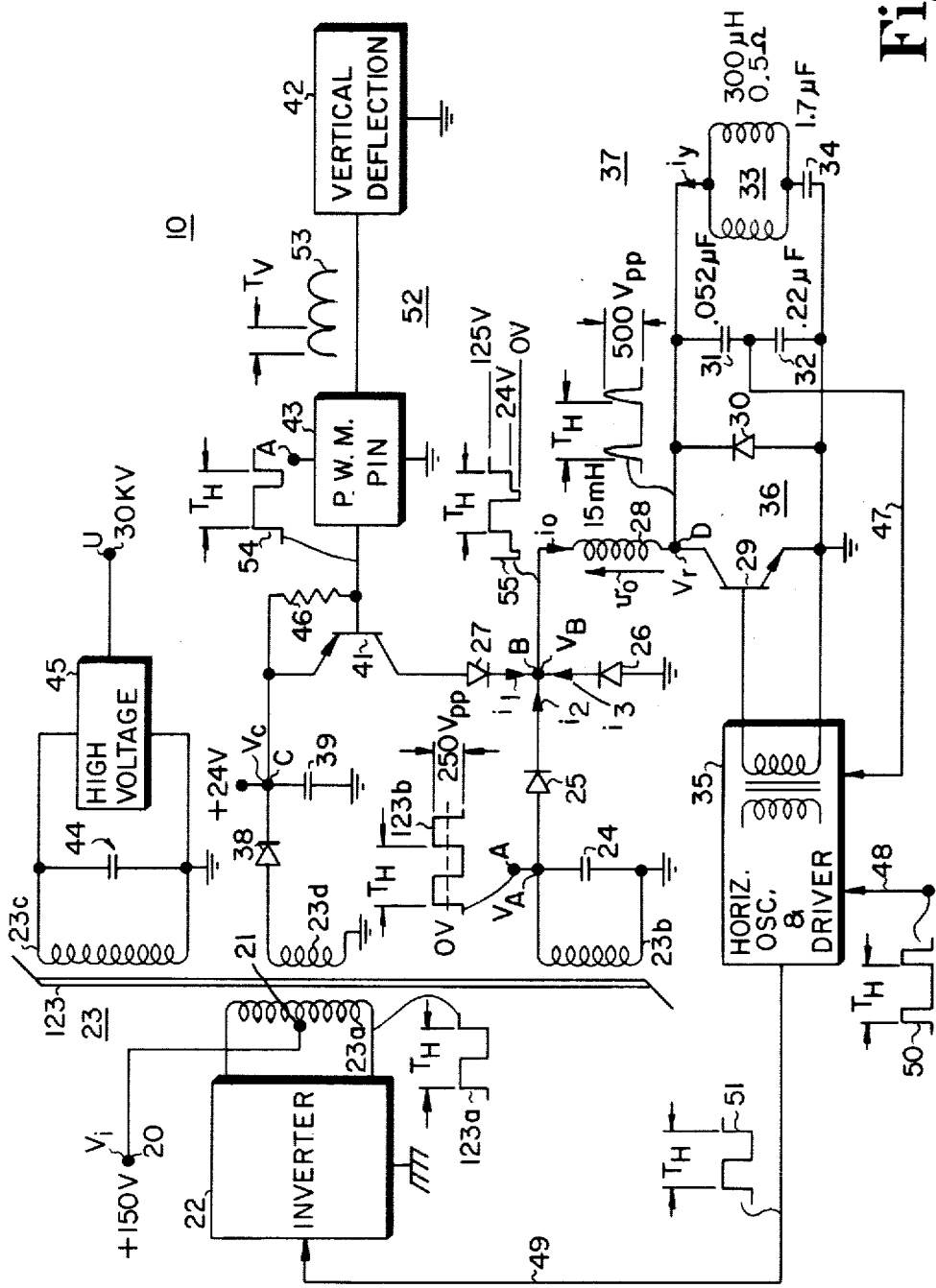
FIG. 1 illustrates a power supply and deflection circuit embodying the invention that provides side pincushion correction.

In a television receiver power supply and horizontal deflection circuit 10, illustrated in FIG. 1, a source of unregulated DC supply voltage, $V_i$, is developed at a terminal 20. The supply voltage may be obtained from a rectified and filtered mains supply, not shown. The supply voltage $V_i$ is applied to a center tap terminal 21 of a primary winding 23a of an input power transformer 23. Primary winding 23a is coupled to an inverter 22, which may be of conventional design. Inverter 22 is energized by the supply voltage $V_i$ and functions as a square-wave generator to produce an input exciting voltage 123a that is applied to the power transformer primary winding 23a.

A secondary winding 23b of power transformer 23 functions as an AC voltage source for energizing a horizontal deflection generator or output stage 37. An alternating polarity output voltage 123b, repeating at the exciting voltage frequency, is developed at a terminal A coupled to secondary winding 23b. For an inverter 22 having a substantially 50% duty cycle operation, a peak-to-peak excursion of output voltage 123b of illustratively 250 volts results in a peak output voltage excursion of 125 volts.

The voltage developed across another secondary winding 23d of power transformer 23 is half-wave rectified by a diode 38 and filtered by a capacitor 39 to produce a DC voltage $V_C$ at terminal C of illustratively +24 volts DC. The voltage $V_C$ is therefore of smaller magnitude than the magnitude of a peak excursion of the square-wave output voltage 123b. A high voltage tertiary winding 23c of power transformer 23 is coupled to a high voltage circuit 45 to produce an accelerating potential at a terminal U, which is applied to the ultor of a television receiver picture tube, not shown.

To regulate the output voltages across secondary windings 23b and 23d and the output voltage across high voltage winding 23c, power transformer 23 may comprise a ferroresonant transformer. The magnetizable core 123 of ferroresonant power transformer 23, illustrated only in electrical schematic form in FIG. 1, may comprise, for example, a rectangular core with the primary winding 23a wound around one leg of the rectangular core. The output windings 23b–23d are wound around core 123 such that they are loosely coupled magnetically to primary winding 23a to provide a predetermined amount of leakage flux as required for ferroresonant operation. To develop regulated voltages across the output windings, the core portion underneath the output windings is magnetically saturated each half cyle of the exciting voltage 123a. To achieve magnetic saturation, the core cross-sectional area under the output windings may be less than that under the primary winding and a resonating capacitor 24 or a resonating capacitor 44 may be coupled across winding 23b or 23c, respectively. The design and construction of ferroresonant power transformer 23 may be similar to that described in the United States Patent Application of F. W. Wendt, entitled "HIGH FREQUENCY FERRORESONANT POWER SUPPLY FOR A DEFLECTION AND HIGH VOLTAGE CIRCUIT", Ser. No. 144,150, filed Apr. 28, 1980, a continuation of Ser. No. 7,815, filed Jan. 30, 1979, now abandoned, or may be similar to that described in the copending U.S. Patent application by F. W. Wendt, entitled "HIGH FREQUENCY FERRORESONANT TRANSFORMER", Ser. No. 7,814, filed Jan. 30, 1979, each of which applications is hereby incorporated by reference.

With a 50% duty cycle alternating polarity square-wave exciting voltage 123a being applied to the ferroresonant power transformer primary winding 23a, both the peak positive and the peak negative excursion of the regulated square-wave output voltage 23b will remain relatively unchanged with variations in the unregulated DC supply voltage $V_i$ if any higher frequency ripple voltage superimposed on output voltage 123b is neglected.

Horizontal deflection generator 37 comprises a horizontal oscillator and driver 35, a trace switch 36 comprising a horizontal output transistor 29 and a damper diode 30, a retrace capacitance comprising the series coupled retrace capacitors 31 and 32, and the series arrangement of a horizontal deflection winding 33 and an S-shaping or trace capacitor 34, the series arrangement being coupled across the trace switch and the retrace capacitance.

Horizontal oscillator and driver 35 turns on horizontal output transistor 29 during the horizontal trace interval of each deflection cycle and turns off the transistor to initiate the horizontal retrace interval. During horizontal retrace, the retrace capacitance develops a retrace pulse voltage across horizontal deflection winding 33, and develops a retrace pulse voltage $V_r$ at the collector of horizontal output transistor 29, as illustrated by the solid-line waveform of FIG. 2a between times $t_0-t_1$ and $t_6-t_7$.

Figure 2:
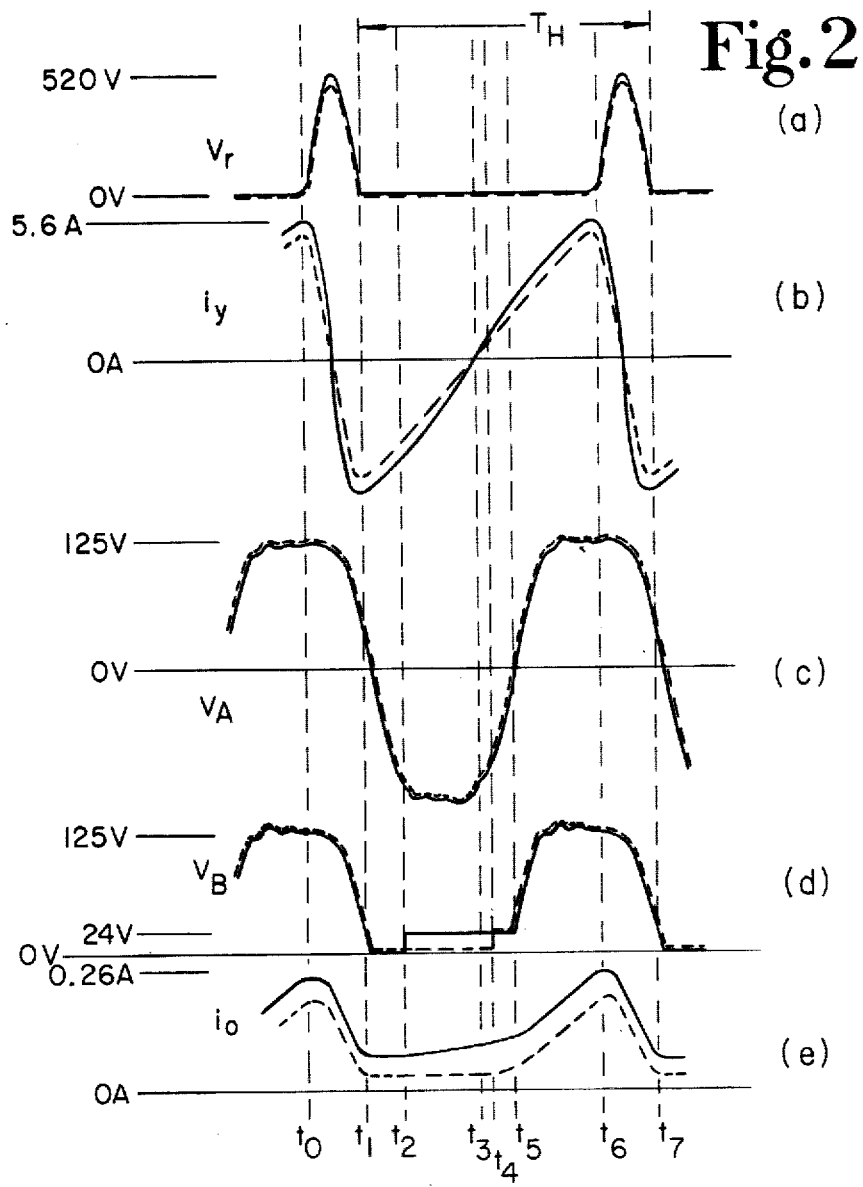
FIGS. 2 and 3 illustrate waveforms associated with the circuit of FIG. 1.

During the horizontal trace interval $t_1-t_6$ of FIGS. 2a and 2b, trace switch 36 is conductive and applies the trace voltage developed across trace capacitor 34 to horizontal deflection winding 33 to generate a positive-going, S-shaped horizontal scanning current $i_y$ in horizontal deflection winding 33, as illustrated by the solid-line waveform of FIG. 2b between times $t_1-t_6$. The center of horizontal trace occurs near time $t_3$. To synchronize horizontal scanning with the picture information to be displayed on the television receiver picture tube screen, a retrace pulse voltage developed across retrace capacitor 32 is applied to horizontal oscillator and driver 35 along a signal line 47 and a horizontal sync pulse 50 is applied along a signal line 48.

To provide synchronized operation of inverter 22 with horizontal scanning, a signal line 49 applies to inverter 22 a synchronizing signal 51 obtained from horizontal oscillator and driver 35. Thus, square-wave exciting voltage 123a and the regulated output voltages such as output voltage 123b repeat at the horizontal deflection frequency $1/T_H$ during synchronized inverter operation. The output voltage developed by secondary winding 23b at terminal A is illustrated in FIG. 2c as the voltage $V_A$ and is phased such that the end instant of the positive portion of the voltage $V_A$ occurs near the end instant of the retrace interval, near times $t_1$ and $t_7$. The voltage $V_A$ is generally of similar waveshape to the idealized square-wave voltage 123b of FIG. 1 but differs from that voltage waveshape in that, for example, the voltage $V_A$ of FIG. 2c does not have vertical leading and trailing edges and has a superimposed AC ripple component of relatively small magnitude.

Current to replenish loss of charge in trace capacitor 34 each deflection cycle due to dissipation within horizontal deflection generator 37 is obtained from terminal B and flows as an input current $i_0$ in an inductor or input choke 28 coupled between terminal B and a terminal D coupled to horizontal deflection winding 33 and the collector of horizontal output transistor 29. The dissipation occurs as a result of resistive losses in such elements as horizontal deflection winding 33, input choke 28 and trace switch 36.

The DC or average value, $V_T$, of the trace voltage developed across trace capacitor 34, when averaged over a substantial number of horizontal deflection cycles, determines the peak-to-peak value of the horizontal scanning current $i_y$. Because no DC voltage can be sustained across an inductor, the average value $V_T$ of the trace voltage equals the average value of the voltage $V_B$ developed at terminal B and applied to input choke 28.

Figure 3:
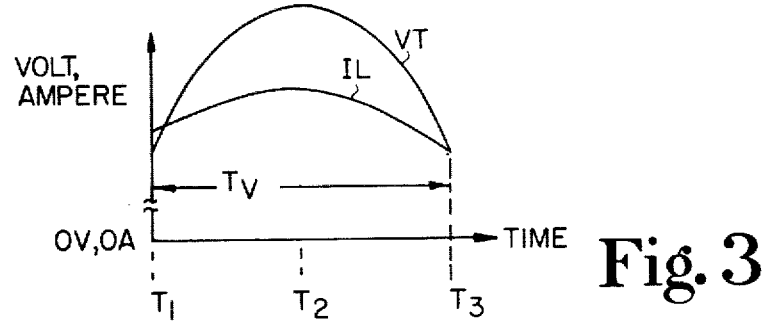

In accordance with a feature of the invention, a pincushion correction circuit 52 varies the average value of the voltage $V_B$ at a vertical rate in a parabolic manner to likewise vary the average value $V_T$ of the trace voltage, as illustrated in FIG. 3. As illustrated in FIG. 3, during the top and bottom portions of vertical scan, near times $T_1$ and $T_3$, the average trace voltage $V_T$ is of low value, and during the center portion of vertical scan, near time $T_2$, the average trace voltage $V_T$ is of high value, thereby providing the required parabolic modulation of the peak-to-peak horizontal scanning current for achieving side pincushion correction.

The average value $I_L$ of the input current $i_0$ in choke 28, when averaged over a substantial number of horizontal deflection cycles, is illustrated in FIG. 3. The average input current $I_L$ varies at a substantially vertical rate. The average load current $I_L$ includes a component, substantially in-phase with the voltage $V_T$, and represents the current required to replenish resistive losses in horizontal deflection generator 37. The average load current $I_L$ also includes a 90° out-of-phase current component, maximum at time $T_1$ and minimum at time $T_3$, representing the charging and discharging at a vertical rate of trace capacitor 34 in accordance with the modulation of the voltage $V_B$ provided by pincushion correction circuit 52.

If the trace capacitor 34 is of relatively small value, as may be the case in horizontal deflection circuits for 110° or wide angle picture tubes, the in-phase current component of the current $I_L$ may typically be much larger than the 90° out-of-phase component. The current waveform $I_L$ will exhibit a generally parabolic waveshape with a peak value occurring near time $T_2$ of FIG. 3.

Pincushion correction circuit 52 comprises a controllable switching transistor 41, and a pulse-width modulator pin control circuit 43 responsive to a vertical rate, $1/T_V$, signal 53 obtained from a vertical deflection circuit 42. The emitter of pin switching transistor 41 is coupled to terminal C and the collector is coupled to terminal B through a diode 27. A resistor 46 is coupled between the base and emitter electrodes of transistor 41.

When pin switching transistor 41 is conductive, the DC voltage $V_C$ is applied to terminal B and a current $i_1$ flows from terminal C to terminal B. The conduction of transistor 41 is controlled by a pulse-width modulated switching voltage 54 applied to the base of the transistor by pin control circuit 43. The negative-going or trailing edge of switching voltage 54 is varied in time by pin control circuit 43 at a vertical rate in a parabolic manner to provide side pincushion correction.

In FIGS. 2a-2e, the solid-line waveforms illustrate various voltages and currents within the circuit of FIG. 1 taken over a horizontal deflection cycle near the center portion of vertical scan, near time $T_2$ of FIG. 3. The dashed-line waveforms of FIGS. 2a-2e represent the same voltages and currents near the bottom portion of vertical scan, near time $T_3$ of FIG. 3.

Consider operation of side pincushion corrected power supply and horizontal deflection circuit 10 over a horizontal deflection cycle near the center of vertical scan, as illustrated by the solid-line waveforms of FIGS. 2a-2e. A diode 25 of FIG. 1 half-wave rectifies the alternating polarity, square-wave output voltage, $V_A$, during the positive polarity voltage interval, $t_5-t_7$, and applies the half-wave rectified voltage to terminal B, as illustrated in FIG. 2d by the voltage $V_B$ developed at terminal B between times $t_5-t_7$.

During the interval $t_5-t_6$, terminal D of input choke 28 is grounded by trace switch 36. The voltage $v_0$ developed across input choke 28 between times $t_5-t_6$ thus equals the voltage $V_B$ developed at terminal B. The current $i_O$ during this interval equals a positive-going sawtooth current, as illustrated in FIG. 2e.

During the horizontal retrace interval $t_6-t_7$ and $t_0-t_1$, the horizontal retrace pulse voltage $V_r$ is applied to input choke 28. The voltage $v_0$ developed across input choke 28 becomes negative and the input current $i_O$ decreases as illustrated in FIG. 2e.

During the interval $t_5-t_7$, the positive polarity interval of the square-wave voltage $V_A$, the input current $i_O$ is obtained from transformer secondary winding 23b, and flows as a current $i_2$ through the winding and half-wave rectifier diode 25. The negative or alternate polarity voltage interval of the square-wave voltage $V_A$ begins near time $t_1$, the beginning of the horizontal trace interval and continues until time $t_5$. Half-wave rectifier diode 25 becomes reverse biased near time $t_1$. To maintain current flow in input choke 28, a flywheel diode 26 is coupled to terminal B. Flywheel diode 26 becomes conductive when half-wave rectifier diode 25 is reverse biased, that is to say, near time $t_1$, as illustrated in FIG. 2d by the zero valued voltage $V_B$ beginning near time $t_1$. Flywheel diode 26 continues conducting until a controlled instant, $t_2$. With no voltage being developed across input choke 28 between times $t_1-t_2$, the current $i_0$ remains a relatively constant, zero-sloped current, as illustrated in FIG. 2e. Between times $t_1-t_2$, the current $i_0$ flows as current $i_3$ in flywheel diode 26.

At the controlled instant $t_2$, coinciding with the negative-going edge of pulse-width modulated switching voltage 54, pin switching transistor 41 becomes conductive, forward biasing diode 27 and applying the DC voltage $V_C$ to input choke 28 at input terminal B. Flywheel diode 26 becomes reverse biased and the voltage $V_B$ at terminal B between times $t_2-t_5$ equals the DC voltage $V_C$.

The voltage $v_0$ developed across input choke 28 between times $t_2-t_5$, the conduction interval of pin transistor 41, thus equals the DC supply voltage $V_C$. A positively-sloped sawtooth input current $i_0$ flows in input choke 28 between times $t_2-t_5$. The input current $i_0$ between times $t_2-t_5$ is obtained from the $V_C$ voltage supply and flows as a current $i_1$ through transistor 41 and diode 27.

At time $t_5$, the voltage $V_A$ becomes a positive voltage, greater than the voltage $V_C$, forward biasing half-wave rectifier diode 25 and reverse biasing diode 27. At the same time, the leading or positive-going edge of switching voltage 54 reverse biases transistor 41.

As mentioned previously, the average value of the voltage at terminal B substantially equals the average value $V_T$ of the trace voltage across capacitor 34. By controlling the conduction duration of pin switching transistor 41 by means of controlling the transistor turn-on instant, the duration during which the voltage $V_C$ is applied to terminal B is controlled, thereby controlling the average values of the voltages $V_B$ and $V_T$.

As previously mentioned, the solid-line waveform of FIG. 2d illustrates the voltage $V_B$ during a horizontal deflection cycle near the center of vertical scan. The turn-on instant of pin switching transistor 41 is advanced to near time $t_2$ to provide maximum average trace voltage $V_T$. The dashed-line waveform of FIG. 2d illustrates the voltage $V_B$ during a horizontal deflection cycle near the bottom of vertical scan, wherein the transistor turn-on instant is retarded to near time $t_4$ to provide minimum average trace voltage $V_T$. The voltage $V_B$ during a horizontal deflection cycle near the top of vertical scan is of a waveshape similar to that illustrated by the dashed-line waveshape of FIG. 2d, with the turn-on instant of transistor 41 also occurring near time $t_4$.

Because the average values of the voltage $V_B$ and trace voltage are substantially the same, a substantially linear relationship exists between the controlled turn-on instant of transistor 41 and the average trace voltage. Pulse-width modulator pin control circuit 43 may be operated open-loop with only the parabolic signal 53 being applied to the input of the control circuit. Negative feedback of the trace voltage to pin control circuit 43 is not required, resulting in simplified control circuit design.

By using a switching arrangement to controllably apply a voltage $V_c$ to input terminal B, the average voltage at the terminal can be made to vary without producing a substantial dissipation in the pincushion correction circuit. Furthermore, by applying the DC voltage $V_c$ to terminal B during the nonconduction interval of half-wave rectifier diode 25, when the voltage at terminal B is zero, a relatively low voltage supply may be used to provide the DC voltage $V_C$, thereby reducing the stress on pin switching transistor 41. Still further, with ferroresonant power transformer 23 developing the ultor accelerating potential at terminal U from the voltage developed across high voltage tertiary winding 23c, the modulation of the retrace pulse amplitude due to side pincushion correction, illustrated in FIG. 2a, has no undesirable effect on raster width.

Figure 4:
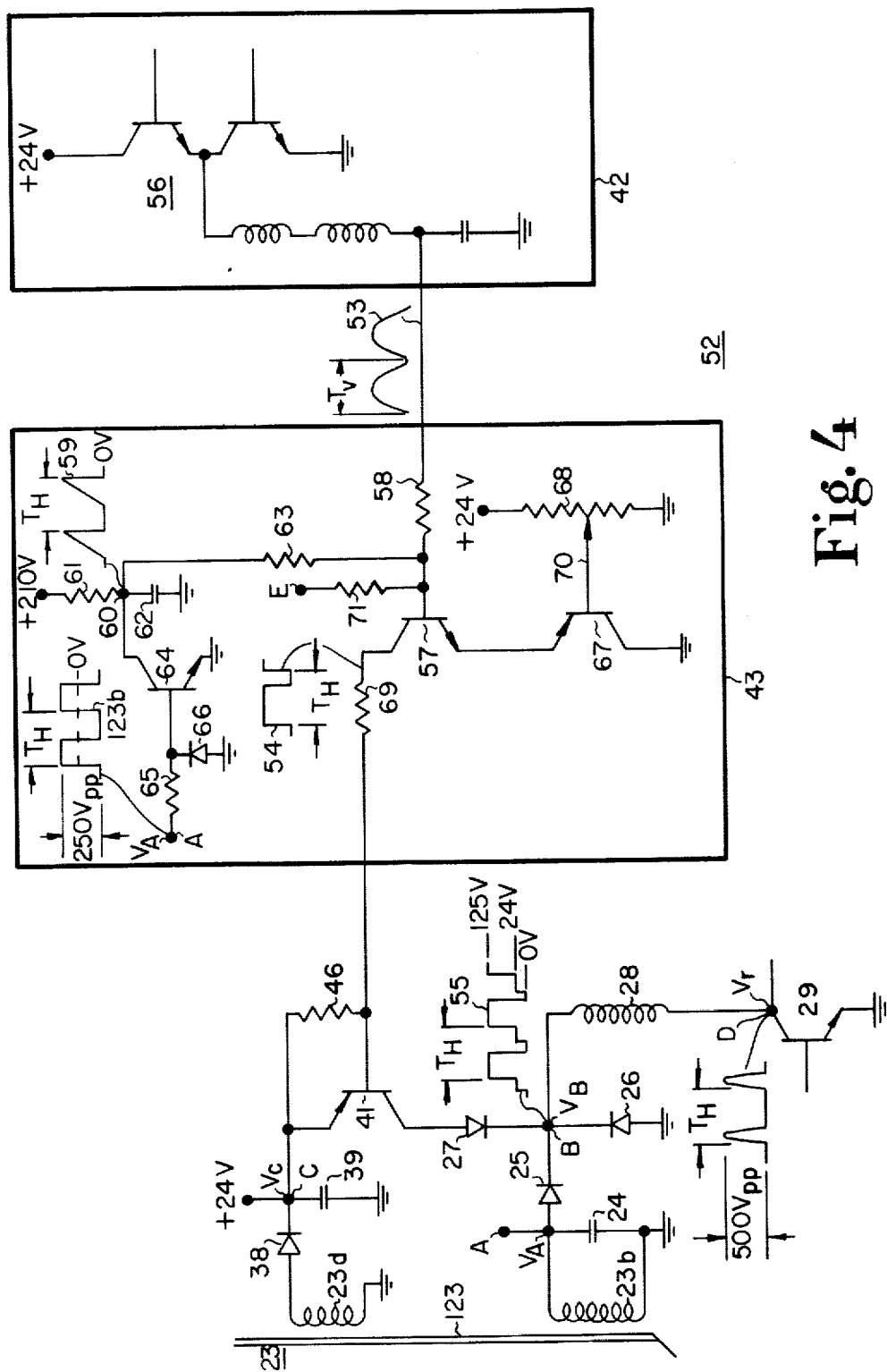
FIG. 4 illustrates a portion of the circuit of FIG. 1 including a specific embodiment of the pulse-width modulator pin control circuit.

FIG. 4 illustrates a portion of the circuit of FIG. 1 including a detailed embodiment of pincushion correction circuit 52. The vertical rate parabolic input signal 53 is obtained from the voltage developed across the S-shaping capacitor of the vertical output stage 56 of vertical deflection circuit 42. The vertical rate parabolic input signal 53 is applied to the base of a comparator transistor 57 of control circuit 43 through a resistor 58. A horizontal rate ramp voltage 59, developed at a terminal 60, is also applied to the base of comparator transistor 57 through a resistor 63. A reference voltage is applied to the emitter of comparator transistor 57. This reference voltage is developed by a buffer transistor 67 coupled to the wiper arm 70 of a potentiometer 68. The end terminals of potentiometer 68 are coupled across the +24 volt supply voltage. The collector of comparator transistor 57 is coupled to the base of pin switching transistor 41 through a resistor 69.

At a controlled instant within each horizontal deflection cycle, the ramp voltage 59 has increased sufficiently to turn on comparator transistor 57, thereby turning on pin switching transistor 41 and applying the voltage $V_C$ to input terminal B. The controlled turn-on instant of comparator transistor 57 and pin switching transistor 41 is varied at a vertical rate in a parabolic manner by vertical parabolic input signal 53. The turn-on instant within a horizontal deflection cycle of FIGS. 2a–2e varies from the instant $t_2$ near the center of vertical scan to the instant $t_4$ near the top and bottom of vertical scan.

To ensure that the range of controlled turn-on instants $t_2$–$t_4$ of pin switching transistor 41 occurs when the voltage at terminal B is zero, during the nonconduction interval of half-wave rectifier diode 25, that is, during the negative polarity voltage interval of the voltage $V_A$, a discharge transistor 64 is coupled to terminal 60. The alternating polarity square-wave voltage $V_A$, idealized as the voltage 123b, is applied to the base of discharge transistor 64 through a resistor 65. A clamping diode 66 is coupled to the base of transistor 64.

During the positive polarity interval of the voltage $V_A$, discharge transistor 64 is conducting and maintains the voltage at terminal 60 at ground potential. During the negative polarity interval of the square-wave voltage $V_A$, discharge transistor 64 is nonconductive, enabling the voltage ramp 59 to be developed at terminal 60 by means of an integrating network comprising a resistor 61 and a capacitor 62, coupled together at terminal 60.

Raster width may be readily controlled by adjusting the position of wiper arm 70 of potentiometer 68, thereby varying the magnitude of the reference voltage developed at the emitter of comparator 57. Adjusting wiper arm 70 shifts the positioning of the range of pin switching transistor turn-on instants $t_2$–$t_4$ of FIGS. 2a–2e within the nonconduction interval $t_1$–$t_5$ of half-wave rectifier diode 25. Adjusting the positioning of the range $t_2$–$t_4$ adjusts the height of the parabolically shaped average trace voltage $V_T$ above the zero volt voltage line of FIG. 3, thereby providing the required width control.

In a fashion similar to side pincushion correction, compensation may be provided for other types of undesirable raster distortion or modulation such as produced by load derived changes in the ultor accelerating potential. A signal representative of ultor loading or of the raster distortion producing quantity is developed at a terminal E and applied to the base of comparator transistor 57 through a resistor 71. The phase of the ultor loading representative signal is such as to vary the turn-on instant of pin switching transistor 41 in a manner opposing the undesirable ultor load induced raster modulation.

What is claimed is:

1. A deflection circuit with raster distortion correction, comprising:
   a source of first voltage including an alternating polarity component voltage;
   a horizontal deflection winding;
   a horizontal deflection generator coupled to said source of first voltage for developing a trace voltage therefrom, said deflection generator including a trace switch coupled to said horizontal deflection winding for periodically applying said trace voltage to said deflection winding to generate horizontal scanning current in said deflection winding;
   a source of second voltage;
   means for coupling said source of second voltage to said deflection generator for only a portion of each cycle of said alternating polarity component voltage to vary said trace voltage;
   means for developing a signal representative of a raster distortion; and
   control means coupled to said second voltage source coupling means for varying the duration of said alternating polarity component voltage cycle portion in response to said raster distortion representative signal to alter said horizontal scanning current so as to provide correction of said raster distortion.

2. A circuit according to claim 1 wherein said raster distortion comprises side pincushion distortion and said raster distortion representative signal varies at a vertical rate.

3. A circuit according to claims 1 or 2 wherein said source of first voltage comprises an AC voltage source and rectifying means coupled to said AC voltage source for developing said first voltage at an output terminal of said rectifying means.

4. A circuit according to claim 3 including an input choke coupled to said rectifying means output terminal and to said deflection generator.

5. A circuit according to claim 4 wherein said second voltage source coupling means comprises switching means having an output terminal coupled to said input choke to apply said second voltage to said input choke for said controlled duration.

6. A circuit according to claim 5 including a flywheel diode coupled to said input choke to conduct choke current when said rectifying means is nonconductive.

7. A circuit according to claim 6 wherein said horizontal deflection generator includes a retrace capacitance developing a retrace pulse voltage across said horizontal deflection winding, said retrace pulse voltage being applied to said input choke.

8. A circuit according to claim 3 wherein said AC voltage source comprises a source of exciting voltage, a power transformer having a primary winding coupled to said source of exciting voltage and a first secondary winding coupled to said rectifying means.

9. A circuit according to claim 8 wherein said source of second voltage comprises a second rectifying means coupled to another seconday winding of said power transformer and filter means coupled to said second rectifying means for developing said second voltage as a substantially DC voltage having a magnitude less than the peak magnitude of said first voltage.

10. A circuit according to claim 9 including an inductance coupled to the AC voltage source coupled rectifying means and to said horizontal deflection generator and wherein said second voltage source coupling means comprises a controllable switch for applying said substantially DC second voltage to said inductance.

11. A circuit according to claim 10 wherein the AC voltage source coupled rectifying means comprises a half-wave rectifier, said controllable switch applying said substantially DC second voltage during a controlled instant within each nonconductive interval of said half-wave rectifier.

12. A circuit according to claim 11 including a flywheel diode coupled to said inductance.

13. A circuit according to claim 12 wherein said source of exciting voltage comprises a source of DC supply voltage, an inverter energized by said DC supply voltage and means coupled to said inverter and said deflection generator for applying a signal to said inverter to synchronize inverter operation with horizontal scanning.

14. A circuit according to claim 13 including a tertiary winding of said power transformer and high voltage means for providing a picture tube ultor accelerating potential.

15. A ferroresonant transformer power supply and deflection circuit providing raster distortion correction, comprising:

a source of exciting voltage;
a ferroresonant transformer having a magnetizable core and a plurality of windings including a primary winding coupled to said exciting voltage source and a first output winding having developed thereacross an alternating polarity output voltage;
a capacitor coupled to one of said plurality of windings and resonating therewith for magnetically saturating a portion of said magnetizable core to regulate said alternating polarity output voltage;
a horizontal deflection winding;
a horizontal deflection generator responsive to the voltage developed at a generator input terminal for generating horizontal deflection current in said horizontal deflection winding, the magnitude of which current varies with the average value of the voltage developed at said generator input terminal;
means for rectifying said alternating polarity output voltage to develop a first component voltage at said generator input terminal;
a source of DC voltage;
a controllable switch coupled to said source of DC voltage and to said generator input terminal for applying said DC voltage to said generator input terminal for only a portion of each cycle of said alternating polarity output voltage commencing at a controllable instant wthin each cycle of said alternating polarity output voltage; and
means coupled to said controllable switch for altering said controllable instant in response to variations of a signal representative of a raster distortion condition to vary the average value of the voltage developed at said generator input terminal in a manner providing correction of said raster distortion condition.

16. A power supply and deflection circuit according to claim 15 wherein said raster distortion condition comprises a side pincushion distortion condition and said raster distortion condition representative signal comprises a vertical rate signal varying in a substantially parabolic manner.

17. A power supply and deflection circuit according to claims 15 or 16 wherein said source of DC voltage comprises a second ferroresonant transformer output winding, a rectifier coupled to said second output winding, and a filter coupled to said rectifier.

18. A power supply and deflection circuit according to claim 17 including a ferroresonant transformer tertiary winding coupled to a high voltage circuit for developing a picture tube ultor accelerating potential from the tertiary winding voltage.

19. A power supply and deflection according to claim 18 wherein said horizontal deflection generator comprises a trace switch, a series arrangement of a trace capacitance and said horizontal deflection winding, with said series arrangement being coupled across said trace switch, a retrace capacitance coupled across said series arrangement and an input choke with one terminal coupled to said generator input terminal and with a second terminal coupled to said horizontal deflection winding.

20. A power supply and deflection circuit according to claim 19 wherein said alternating polarity output voltage rectifying means comprises a half-wave rectifier conductive during a first polarity voltage interval of said alternating polarity output voltage and including a flywheel diode coupled to said half-wave rectifier, said controllable switch conducting during the alternate polarity voltage interval.

21. A power supply and deflection circuit according to claim 20 wherein said exciting voltage source comprises a substantially square-wave generator operating at the horizontal deflection frequency.

22. A horizontal deflection circuit with side pincushion distortion correction, comprising:

a source of alternating polarity input voltage;
an input transformer having a primary winding excited by said alternating polarity input voltage for developing an alternating polarity output voltage across a secondary winding of said input transformer;
an input choke;
a half-wave rectifier coupled to said secondary winding and to said input choke for applying said alternating polarity output voltage to said input choke during a first polarity interval of said alternating polarity output voltage;
a source of DC voltage;
first switching means coupled to said DC voltage source and to said input choke for applying said DC voltage to said input choke during a first portion of the alternate polarity interval of said alternating polarity output voltage;

a flywheel diode coupled to said input choke for conducting choke current during a second portion of said alternate polarity interval;

a horizontal deflection winding;

a horizontal deflection generator coupled to said input choke for developing a trace voltage from the voltage applied to said input choke, said deflection generator including a trace switch coupled to said horizontal deflection winding for periodically applying said trace voltage to said deflection winding to generate horizontal scanning current in said deflection winding; and control means coupled to said first switching means and responsive to a side pincushion correction signal for altering the conduction of said first switching means to provide side pincushion correction to said horizontal scanning signal.

23. A circuit according to claim 22 wherein said source of alternating polarity input voltage comprises a square-wave generator operated at the horizontal deflection frequency.

24. A circuit according to claim 23 wherein said DC voltage is less in magnitude than the peak magnitude of said alternating polarity output voltage during said alternate polarity interval.

25. A circuit according to claim 24 wherein said input transformer comprises a ferroresonant transformer for regulating the voltage developed across said secondary winding.

* * * * *